United States Patent
Mattingley et al.

(10) Patent No.: US 7,166,644 B2
(45) Date of Patent: Jan. 23, 2007

(54) POROUS POLYMERIC MEMBRANE COMPRISING VINYLIDENE FLUORIDE

(75) Inventors: Neville John Mattingley, Wantage (GB); Esam Kronfli, Swindon (GB)

(73) Assignee: ABSL Power Solutions Ltd, Abingdon (GB)

(*) Notice: Subject to any disclaimer, the term of this patent is extended or adjusted under 35 U.S.C. 154(b) by 0 days.

(21) Appl. No.: 10/520,943

(22) PCT Filed: Jun. 23, 2003

(86) PCT No.: PCT/GB03/02682

§ 371 (c)(1),
(2), (4) Date: Jan. 12, 2005

(87) PCT Pub. No.: WO2004/009684

PCT Pub. Date: Jan. 29, 2004

(65) Prior Publication Data

US 2006/0148911 A1    Jul. 6, 2006

(30) Foreign Application Priority Data

Jul. 19, 2002  (GB)  .................  0216834.2

(51) Int. Cl.
*C08J 5/20* (2006.01)
*C08J 9/26* (2006.01)
*C08J 9/28* (2006.01)

(52) U.S. Cl. ............... 521/27; 521/61; 521/64

(58) Field of Classification Search ........... 521/27, 521/64, 61
See application file for complete search history.

(56) References Cited

U.S. PATENT DOCUMENTS

| | | | | |
|---|---|---|---|---|
| 3,620,895 A | * | 11/1971 | Bailey et al. ............... | 428/163 |
| 4,238,571 A | * | 12/1980 | Mano et al. ................. | 521/62 |
| 4,267,364 A | * | 5/1981 | Grot et al. ................... | 560/183 |
| 4,384,047 A | * | 5/1983 | Benzinger et al. ........... | 521/64 |
| 4,399,025 A | * | 8/1983 | Fletcher et al. ............. | 208/180 |
| 4,433,082 A | * | 2/1984 | Grot ........................... | 524/544 |
| 4,861,480 A | * | 8/1989 | Berardo et al. ............. | 210/490 |
| 4,965,291 A | * | 10/1990 | Kitoh et al. .................. | 521/64 |
| 5,158,721 A | * | 10/1992 | Allegrezza et al. ......... | 264/425 |
| 5,296,318 A | * | 3/1994 | Gozdz et al. ............... | 429/316 |
| 5,384,047 A | | 1/1995 | Scheckler ................... | 210/490 |
| 6,013,688 A | * | 1/2000 | Pacheco et al. ............ | 521/64 |
| 6,042,958 A | * | 3/2000 | Denton et al. .............. | 429/30 |
| 6,248,469 B1 | * | 6/2001 | Formato et al. ............ | 429/41 |
| 2003/0022951 A1 | * | 1/2003 | Coowar et al. ............. | 521/27 |
| 2003/0170545 A1 | * | 9/2003 | Coowar et al. ............. | 429/309 |
| 2004/0048165 A1 | * | 3/2004 | Coowar ...................... | 429/332 |

FOREIGN PATENT DOCUMENTS

| | | | |
|---|---|---|---|
| EP | 335805 A | * | 10/1989 |
| EP | 0730316 | | 9/1996 |
| GB | 2309701 | | 8/1997 |
| GB | 2309701 A | * | 8/1997 |
| JP | 62-11521 | | 1/1987 |
| WO | WO 02/11230 | | 2/2002 |

OTHER PUBLICATIONS

WPI/DERWENT Abstract of JP 62-011521.

* cited by examiner

*Primary Examiner*—Ling-Sui Choi
*Assistant Examiner*—M. Bernshteyn
(74) *Attorney, Agent, or Firm*—William H. Holt

(57) ABSTRACT

A process for producing a porous polymeric structure which process comprises preparing a solution comprising a polymer which comprises vinylidene fluoride in a solvent/non-solvent mixture; holding the solution at an elevated temperature until the polymer is completely solvated; casting the solution to form a thin layer; and drying the thin layer to form a membrane. The polymer is dispersed in the non-solvent before addition of the solvent, when preparing the solution, to prevent microgel formation. The prolonged solvation at elevated temperature provides a stable solution, and enables membranes of controlled porosity to be formed.

6 Claims, No Drawings

POROUS POLYMERIC MEMBRANE COMPRISING VINYLIDENE FLUORIDE

The present invention relates to porous polymeric membranes. The invention relates in particular to a process for producing a porous polymeric membrane and to the use of such a membrane in a lithium cell or in a fuel cell.

For many years it has been known to make cells with lithium metal anodes, and cathodes of a material into which lithium ions can be intercalated or inserted. Such cells may use, as electrolyte, a solution of a lithium salt in an organic liquid such as propylene carbonate, and a separator such as filter paper or polypropylene. More recently the use of a solid-state ion-conducting polymer has also been suggested as an electrolyte. For secondary or rechargeable lithium cells, the use of lithium metal anodes is unsatisfactory as problems arise from dendrite growth. The elimination of this problem is now possible by employing a material able to intercalate lithium ions reversibly at very low voltages, such as graphite, leading to so-called "lithium-ion", "rocking-chair", or "swing" lithium rechargeable batteries. These lithium cells operate on the principle that they contain not lithium metal, but lithium ions which are rocked back and forth between two intercalation materials during the charging and discharging parts of the cycle.

A polymer electrolyte has been proposed by Gozdz et al. (U.S. Pat. No. 5,296,318), which comprises a copolymer of 75 to 92% vinylidene fluoride and 8 to 25% of hexafluoropropylene, blended with a lithium salt and a compatible solvent such as ethylene carbonate/propylene carbonate mixture and cast from solution in a low boiling-point solvent such as tetrahydrofuran. GB 2 309 701 B (AEA Technology) describes how the adhesion of a polymeric electrolyte composition can be enhanced by grafting suitable mono-unsaturated groups onto the polymer chain, and in this case the polymeric chain might be a homopolymer PVdF, or a copolymer or terpolymer consisting primarily of vinylidene fluoride. It is also possible to make a solid polymer electrolyte by first making a porous film of the polymer material, and then immersing the film in the solution of lithium salt in an organic solvent so the electrolyte solution combines with the polymer film, as described in EP 0 730 316 A (Elf, Atochem). However, with known methods of making porous membranes, it is difficult to achieve micropores of a substantially uniform size and to control the porosity of the resulting film.

Fuel cells use a porous membrane to separate the anode and the cathode. The membrane is typically a multilayered assembly and may include, for example, a porous membrane and one or more diffusion layers. Improved membranes are needed to improve the uniform delivery of gas to the fuel cell plate.

The present invention provides a process for producing a porous polymeric membrane which process comprises:
  a) preparing a solution comprising a polymer which comprises vinylidene fluoride in a solvent/non-solvent mixture by dispersing the polymer in the non-solvent prior to addition of the solvent wherein the boiling point of the non-solvent is higher than that of the solvent;
  b) holding the solution at an elevated temperature of at least 40° C. until the polymer is completely solvated;
  c) casting the solution to form a thin layer; and
  d) drying the thin layer to form a membrane.

The polymer typically comprises primarily vinylidene fluoride. Thus the polymer may be a homopolymer such as polyvinylidene fluoride (PVdF), or a copolymer of vinylidene fluoride with, for example hexafluoropropylene, or a terpolymer. Typically preferred grades of polymer are PVdF homopolymer Solvay Solef 1015 or 6020, copolymers Solvay Solef 20615 or 20815 or Atochem 2801 and terpolymers comprising vinylidene fluoride, hexafluoropropylene and chlorotrifluoroethylene as described in WO 02/11230.

The polymer may also be a polymer in which the polymeric chain consists primarily of vinylidene fluoride, onto which is grafted a mono-unsaturated carboxylic, sulphonic or phosphonic acid, ester, or amide. The monomer to be grafted onto the polymer chain should have only one double-bond in the carbon chain R—, and one or more carboxyl groups —COOH, sulphonic acid groups —$SO_2OH$, phosphonic acid groups —$PO(OH)_2$, ester groups —COOR', or amide groups —$CONH_2$. Generally smaller monomers, with less than five carbon atoms in the carbon chain R—, are preferable. For example acrylic acid; crotonic acid, vinylacetic acid, methylacrylic acid (which are isomers of butenoic acid); isomers of pentenoic acid such as allylacetic acid; etc. The corresponding amides (and substituted amides) may also be used. In an ester, the group R' might be methyl, ethyl or butyl; for example esters such as methyl acrylate or butyl acrylate may be used. Some preferred monomers for grafting are acrylic acid or dimethyl acrylamide, but a range of other monomers that incorporate the final group are also suitable.

The grafting can be achieved by an irradiation process. For example the polymer chain substrate and the graft monomer material together may be subjected to continuous or intermittent irradiation; or more preferably the substrate is pre-irradiated before being brought into contact with the monomer material. The irradiation may be with an electron beam, Gamma-rays or X-rays. The irradiation activates the substrate (the polymer chain) apparently by generating free radicals. The degree of grafting is determined by several factors, the most important being the extent of pre-activation of the polymer substrate by the irradiation, the length of time that the activated polymer is in contact with the graft monomer material, the extent to which the monomer can penetrate the polymer, and the temperature of the polymer and the monomer when in contact. The degree of grafting in the resulting material is desirably between 2 and 20% of the final weight, more preferably between 3 and 12%, for example 5% or 10%.

Further components may also be present in the solution for example, viscosity modifiers such as carboxymethylcellulose and surface tension modifiers such as oxalic or maleic acid.

The polymer is mixed with the non-solvent to form a slurry and then the solvent is added to form a homogeneous solution. Typically a slurry of polymer and non-solvent is formed and heated to about 60° C., preferably in a non-metallic container (for example of glass, or of a plastic such as polypropylene) with stirring, and then the solvent is added rapidly (for example at about 1 liter in 5 seconds).

If the polymer is mixed with the solvent first, and the non-solvent then added to the solution, this generates a microgel, so the solution is unstable and does not give reproducible membranes.

The non-solvent is a liquid which does not dissolve the polymer when used alone, The non-solvent should not only dissolve in the solvent, but it should be miscible with the solvent in substantially all proportions. The boiling point of the non-solvent is higher than that of the solvent, preferably 20° C. higher, more preferably 40° C. higher or more. Examples of the non-solvents include alcohols containing 6 to 20 carbon atoms such as, octanol, decanol and dodecanol, and mixtures thereof, preferably decanol, dodecanol and mixtures thereof. Particularly preferred non-solvents are a 50:50 mixture of dodecanol and decanol or dodecanol alone.

The solvent is a liquid which can dissolve or swell the polymer. The solvent may be chosen from for example ketones, ethers, N,N-dimethylformamide (DMF), N,N-dimethylacetamide (DMA), N,N-diethylacetamide, N-methyl-2-pyrrolidone (NMP), hexamethylphosphoramide, tetramethylurea and dimethyl sulfoxide (DMSO) or a mixture thereof. DMF and NMP are preferred solvents. More preferably NMP is the solvent.

The ratio of non-solvent to solvent in the solution can be varied. Typically the proportion of non-solvent in the solvent/non-solvent mixture is 2 to 30 wt %, preferably 5 to 15 wt %, more preferably 7 to 10 wt %.

The amount of polymer in the solution is generally from 3 to 30 wt k, preferably from 5 to 20 wt %, more preferably from 8 to 15 wt W.

Solvation of the polymer takes place at an elevated temperature. An elevated temperature is a temperature above room temperature (which is taken to be 20° C.). The temperature chosen is specific to the polymer and solvent/non-solvent combination that is used and the amount of time over which salvation takes place. The elevated temperature is at least 40° C., more typically at least 50° C. for example 55° C. A lower temperature may be used if salvation takes place over a longer period of time.

Typically salvation takes place over several days. The salvation process continues until the polymer(s) are completely solvated. The exact salvation time required varies depending on the solvent/non-solvent mixture, the choice of polymer or polymers and the temperature used. Typically salvation takes place over from 4 to 14 days, preferably 5 to 10 days and most preferably 5 to 7 days. For example, PVdF (Solvay Solef 6020/1001) in N-methyl-2-pyrrolidone and a 50:50 mixture of decanol and dodecanol typically solvates completely in from 5 to 14 days, typically 10 days depending on the ratio of non-solvent to solvent in the solution. Gel formation during the solvation process is so slow as to be negligible. Solvation also occurs without the formation of a microgel.

Once the polymer is fully solvated, the solution is stable at room temperature for several weeks. Thus, the viscosity of the solution does not change over time, the colour of the solution remains constant and there is no separation of the solvent or non-solvent from the solution, Furthermore the solution forms reproducible membranes with consistent properties, when cast. Therefore it is not necessary to cast the solution into a film immediately.

The solution is typically cast onto a non-porous substrate such as aluminium foil or Mylar film. The aluminium foil is typically about 20 μm thick whereas the Mylar film is typically about 100 μm thick. The solution can also be cast onto an anode or cathode if the anode or cathode is made of a material that is not too porous.

When casting the solution, the solution is typically cast as a thin layer less than 0.5 mm thick, preferably less than 0.3 mm thick, on the substrate.

The film is formed by drying in typically at least two successive drying zones in a drying machine; the film is not contacted with any liquids. Preferably the drying machine has three or four drying zones, most preferably four drying zones. Different temperatures are maintained in each of the zones and the temperatures increase from zone to zone in the direction of the film transfer. Typical temperature values in the drying zones when using a knife-over-roll continuous method for producing a membrane on a moving web are as follows:

| first zone | from 50° C. to 120° C. |
| second zone | from 80° C. to 150° C. |

Typical temperature pairings could be, for example, 65° C. in the first zone and 100° C. in the second zone, or 95° C. in the first zone and 120° C. in the second zone. If the machine has three or four drying zones then the temperature change from zone to zone can be more gradual. For example, where the machine has four drying zones, the zones can be set at 65° C., 75° C., 95° C. and 110° C. in order.

The speed of the moving web typically ranges from 0.2 to 5.0 m/min. The speed of the web varies depending on the length of the drying zone and the number of zones. The more zones the machine has, the faster the web can be run without adverse effects on the properties of the membrane.

The solution is dried to form a membrane in the presence of a gas. In one embodiment the gas is dry gas, for example dry air. For example, air with a dewpoint of less than −20° C., for example from −35° C. to −37° C. may be used. However, the gas need not be anhydrous. The gas may also be humid air, for example air supplied at ambient conditions of 34% relative humidity at 16° C. However if air humidity varies, the membrane's permeability will also vary.

The porosity of the resulting porous polymeric membrane can be controlled by varying the ratio of non-solvent to solvent, the ratio of polymer to solvent/non-solvent, the temperatures of the first and the second drying zones and the speed of the moving web.

The porosity of the membrane produced can be measured on a Gurley machine. This gives an indication of the relative porosity of different films measured using this machine. The machine measures the time taken in seconds for 100 cm$^3$ of air to pass through one square inch (6.45 cm$^2$) of the membrane at a small standard pressure difference (1.215 kPa). This results in a reading known as a Gurley number or Gurley value. This can also be expressed as having the units Gurley seconds. Commercial films are available which give Gurley numbers (Gurley seconds) of from 400 to 600. Films with a Gurley number of <60 tend to exhibit shorting when used in a battery. However, they may be suitable for use in fuel cells. The films with a Gurley number of from 50 to 200, more preferably 60 to 100, are preferred in the context of the present invention. As Gurley numbers increase the porosity of the membrane decreases indicating that it is harder to pass air through the membrane. This could be due to the membrane having smaller pores or fewer larger pores depending on the distribution of the pores.

Films as a thin as 5 μm can be made according to the present invention. Thus, the films have a thickness of at least 5 μm, preferably 10 to 30 μm, more preferably 15 to 25 μm, most preferably 17 to 22 μm.

One advantage of the present invention is that thin films can be made which have adequate strength to be used in a battery. The thin films also do not suffer from shorting.

In a second aspect the present invention provides a membrane comprising a polymer comprising vinylidene fluoride with a thickness of from 5 to 30 μm and a Gurley number of from 5 to 300 (Gurley seconds). The membranes preferably have a Gurley number of from 50 to 200, more preferably from 60 to 100, most preferably from 70 to 90. Such membranes have not hitherto been available.

The present invention also provides the use of a membrane of the present invention or of a membrane produced according to the present invention as a separator in a battery. The membrane is suitable for use in a range of different types of battery, for example, nickel-cadmium, nickel metal hydride, lithium ion and lithium polymer batteries. The controllable porosity and thickness of the membrane as well as the high strength of these membranes makes them particularly advantageous for this use.

The present invention also provides the use of a membrane of the present invention or a membrane produced according to the process of the present invention in a fuel cell. The present invention also provides a laminate comprising a membrane of the present invention and the use of such a laminate in a fuel cell.

The present invention is now described in greater detail by way of example.

EXAMPLES

The Gurley numbers given for the membranes described in these examples were obtained on an Automatic Densometer model 4340 produced by Gurley Instruments of 514 Fulton Street, Troy, N.Y., USA.

Example 1

100 g PVdF (Solef 6020) having an intrinsic viscosity of 0.210 l/g (DMF, 25° C.) was dispersed in 70 g of octanol. The slurry was stirred and 900 g of DMF was added. The mixture was stirred for 1 day at 55° C. and maintained at 55° C. for 6 further days until complete solvation was achieved.

The solution was cast onto a polyester web moving at 0.5 m/minute using a knife-over-roll coating system. The blade gap was set to 0.32 mm and the drying zone temperatures were 65° C. for zone 1 and 100° C. for zone 2. This resulted in a finished microporous film with a thickness of 17 μm and an air permeability of 32 Gurley seconds.

Increasing the drying temperatures to 80° C. for zone 1 and 105° C. for zone 2 produced a film with a thickness of 17 μm and an air permeability of 85 Gurley seconds.

Further increasing the drying temperatures to 95° C. for zone 1 and 110° C. for zone 2 produced a film with a thickness of 17 μm and an air permeability of 93 Gurley seconds.

Example 2

100 g of PVdF (Solef 6020) having an intrinsic viscosity of 0.210 l/g (DMF, 25° C.) was dispersed in 80 g of decanol. The slurry was stirred and 900 g of NMP was added. The mixture was stirred and heated until complete solvation was achieved as described in Example 1.

The solution was cast onto a polyester web moving at 0.5 m/minute using a knife-over-roll coating system. The blade gap was set to 0.32 mm. The drying zone temperatures and film properties are set out in Table 1 below.

TABLE 1

| | Example 2.1 | Example 2.2 |
|---|---|---|
| Drying zone temp. Zone 1 (° C.) | 95 | 110 |
| Drying zone temp Zone 2 (° C.) | 110 | 130 |
| Film thickness (μm) | 14 | 16 |
| Air permeability (Gurley secs) | 12 | 40 |

Example 3

100 g of PVdF (Solef 6020) having an intrinsic viscosity of 0.210 l/g (DMF, 25° C.) was dispersed in 70 g of a 1:1 mixture (by weight) of decanol and dodecanol. The slurry was stirred and 900 g of NMP was added. The mixture was stirred for 1 day at 55° C. and maintained at 55° C. for 10 further days until complete solvation was achieved.

The solution was cast onto a polyester web moving at 0.5 m/minute using a knife-over-roll coating system. The blade gap was set to 0.32 mm. The drying zone temperatures and film properties are set out in Table 2 below.

TABLE 2

| | Example 3.1 | Example 3.2 |
|---|---|---|
| Drying zone temp. Zone 1 (° C.) | 75 | 110 |
| Drying zone temp. Zone 2 (° C.) | 110 | 130 |
| Film Thickness (μm) | 13 | 18 |
| Air Permeability (Gurley secs) | 70 | 180 |

Example 4

100 g of PVdF (Solef 6020) having an intrinsic viscosity of 0.210 l/g (DMF, 25° C.) was dispersed in 100 g of a 1:1 mixture (by weight) of decanol and dodecanol. The slurry was stirred and 900 g of NMP was added. The mixture was stirred and heated until complete solvation was achieved as described in Example 3.

The solution was cast onto a polyester web moving at 0.5 m/minute using a knife-over-roll coating system. The blade gap was set to 0.32 mm. The drying zone temperatures and film properties are set out in Table 3 below.

TABLE 3

| | Example 4.1 | Example 4.2 |
|---|---|---|
| Drying zone temp. Zone 1 (° C.) | 75 | 110 |
| Drying zone temp. Zone 2 (° C.) | 110 | 130 |
| Film Thickness (μm) | 22 | 24 |
| Air Permeability (Gurley secs) | 9 | 55 |

It will be appreciated from the above Examples that the porosity becomes less (i.e. the Gurley number increases) if the dryer is at a higher temperature, and if the proportion of non-solvent is less. Film quality is generally improved if the difference in boiling point between the non-solvent and the solvent is greater than 25° C.

Example 5

100 g of PVdF (Solef 6020) having an intrinsic viscosity of 0.210 l/g (DMF, 25° C.) was dispersed in 100 g of dodecanol. The slurry was stirred and 900 g of NMP was added. The mixture was stirred and heated until complete solvation was achieved as described in Example 1.

The solution was cast onto a polyester web moving at 0.5 m/minute using a knife-over-roll coating system. The blade gap was set to 0.30 mm. The drying zone temperatures and film properties are set out in Table 4 below.

TABLE 4

|  | Example 5 |
| --- | --- |
| Drying zone temp. Zone 1 (° C.) | 75 |
| Drying zone temp Zone 2 (° C.) | 110 |
| Film thickness (μm) | 24 |
| Air permeability (Gurley secs) | 76 |

Example 6

100 g of PVdF (Solef 6020) having an intrinsic viscosity of 0.210 l/g (DMF, 25° C.) was dispersed in 80 g of dodecanol. The slurry was stirred and 900 g of NMP was added. The mixture was stirred and heated until complete solvation was achieved as described in Example 1.

The solution was cast onto a polyester web moving at 0.5 m/minute using a knife-over-roll coating system. The blade gap was set to 0.32 mm. The drying zone temperatures and film properties are set out in Table 5 below.

TABLE 5

|  | Example 6 |
| --- | --- |
| Drying zone temp. Zone 1 (° C.) | 85 |
| Drying zone temp Zone 2 (° C.) | 110 |
| Film thickness (μm) | 22 |
| Air permeability (Gurley secs) | 146 |

Example 7

100 g of PVdF (Solef 6020) having an intrinsic viscosity of 0.210 l/g (DMF, 25° C.) was dispersed in 60 g of dodecanol. The slurry was stirred and 900 g of NMP was added. The mixture was stirred and heated until complete solvation was achieved as described in Example 1.

The solution was cast onto a polyester web moving at 0.5 m/minute using a knife-over-roll coating system. The blade gap was set to 0.30 mm. The drying zone temperatures and film properties are set out in Table 6 below.

TABLE 6

|  | Example 7 |
| --- | --- |
| Drying zone temp. Zone 1 (° C.) | 85 |
| Drying zone temp Zone 2 (° C.) | 110 |
| Film thickness (μm) | 19 |
| Air permeability (Gurley secs) | 88 |

The invention claimed is:

1. A process for producing a porous polymeric membrane which process comprises:
   a) preparing a solution comprising a polymer which comprises vinylidene fluoride in a solvent/non-solvent mixture in which the proportion of non-solvent is 2 to 30 wt % by dispersing the polymer in the non-solvent prior to addition of the solvent wherein the boiling point of the non-solvent is higher than that of the solvent;
   b) holding the solution at an elevated temperature of at least 40° C. until the polymer is completely solvated;
   c) casting the solution to form a thin layer; and
   d) drying the thin layer to form a membrane.

2. Process according to claim 1 wherein the solution comprises polyvinylidene fluoride (PVdF).

3. Process according to claim 1 wherein the solvent is N,N-dimethylformamide (DMF), N,N-dimethylacetamide (DMA) or N-methyl-2-pyrrolidone (NMP).

4. Process according to claim 1 wherein the non-solvent is octanol, decanol, dodecanol or a mixture thereof.

5. Process according to claim 1 wherein the solution is solvated for up to 14 days.

6. Process according to claim 1 wherein mono-unsaturated carboxylic, sulphonic or phosphonic acid, ester or amide groups are grafted onto the vinylidene fluoride.

* * * * *